March 5, 1968 R. C. GRAY ETAL 3,371,483
HYDRAULIC CONTROL SYSTEM
Filed May 23, 1966 3 Sheets-Sheet 1

INVENTORS
ROBERT C. GRAY
LAWRENCE A. SHIVELY
OTTO F. STEINKE

THEIR ATTORNEYS

March 5, 1968 R. C. GRAY ETAL 3,371,483
HYDRAULIC CONTROL SYSTEM
Filed May 23, 1966 3 Sheets-Sheet 2

INVENTORS
ROBERT C. GRAY
LAWRENCE A. SHIVELY
OTTO F. STEINKE

THEIR ATTORNEYS

INVENTORS
ROBERT C. GRAY
LAWRENCE A. SHIVELY
OTTO F. STEINKE

THEIR ATTORNEYS ced Mar. 5, 1968

3,371,483
HYDRAULIC CONTROL SYSTEM
Robert C. Gray, New Carlisle, and Lawrence A. Shively and Otto F. Steinke, Dayton, Ohio, assignors to The Globe Tool and Engineering Company, Dayton, Ohio, a corporation of Ohio
Filed May 23, 1966, Ser. No. 552,006
16 Claims. (Cl. 60—53)

This invention relates to a hydraulic control system and more particularly to such a system for use in armature or coil winding machines. The invention herein is described in association with an automatic double flier armature winding machine. However it will be appreciated that the invention is not necessarily so limited.

The fliers of armature winding machines must be stopped and started at precise locations at several points during a winding cycle. An object of this invention is to provide a simple, inexpensive hydraulic drive and controls therefor for accurately starting and stopping the fliers of coil winding and armature winding machines.

United States Patent No. 3,013,737, issued to Harry W. Moore, describes an automatic double flier armature winding machine utilizing a hydraulic drive in which acceleration and deceleration of the fliers is accomplished in a controlled manner. Because of the high speeds of rotation necessary for the mass production of armatures, it is now considered essential to decelerate the flier rotation before stopping. Another object of this invention is to provide for controlled deceleration of fliers for armature winders and the like by accurately controlling a variable displacement pump. In this connection, it is a further object of this invention to provide for the gradual deceleration of flier rotation from a high speed to a low speed prior to the stopping of the flier rotation.

On occasion, controlled acceleration from a stop position is also required and it is an object of this invention to provide improved mechanism which is sufficiently flexible for achieving both controlled acceleration and deceleration.

A further object of this invention is to provide for a simple but reliable and accurate control of a hydraulic drive system through the use of a pneumatically operated speed and direction control device. A related object of this invention is to provide a simple arrangement for a pneumatically operated speed control device for reversing part of the mode of operation of such device.

Other objects and advantages reside in the construction of parts, the combination thereof, the method of manufacture and the mode of operation, as will become apparent from the following description.

In the drawings:

In FIGURE 1 parts of the machine have been omitted, shown diagrammatically or schematically, and cut away for purposes of simplification and clarity.

Figure 10:
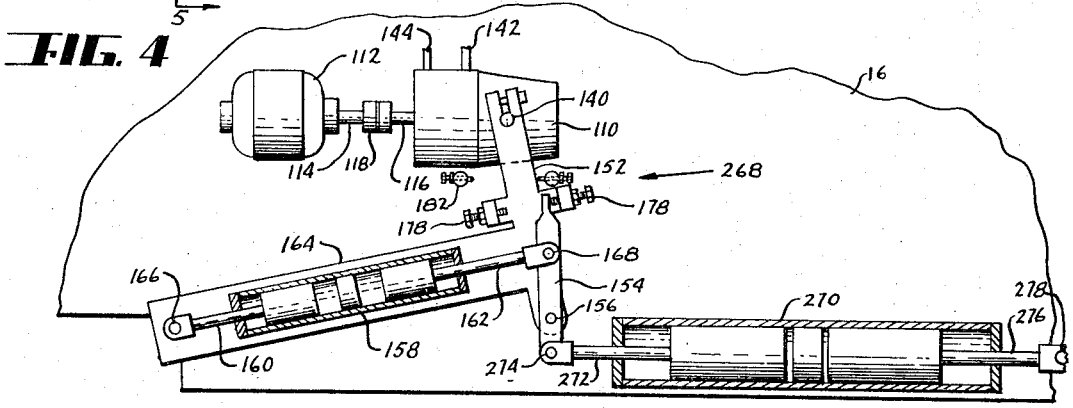

FIGURE 10 discloses a modified speed and direction control device in accordance with this invention.

Figure 1:
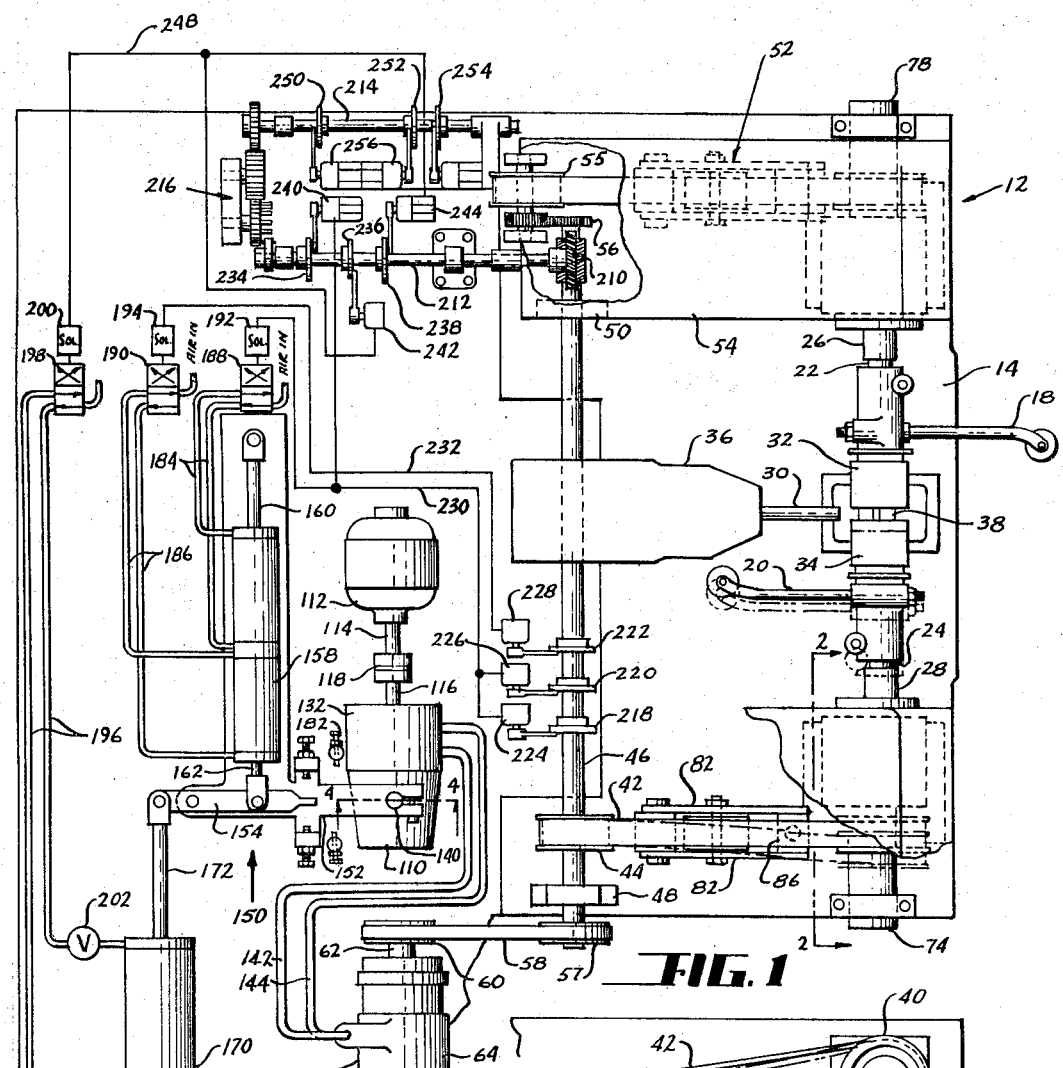
FIGURE 1 is a plan view of an armature winding machine made in accordance with this invention.

With reference to FIGURE 1, an armature winding machine generally designated 12 is shown including an upper support plate 14 and a lower support plate 16. The support plates 14 and 16 are mounted upon suitable standards (not shown). The mechanical operating parts of the machine 12 includes a pair of fliers 18 and 20 mounted for rotation upon flier shafts 22 and 24, respectively, journalled for rotation in journals 26 and 28, respectively, mounted upon the upper support plate 14. When rotating, the fliers 18 and 20 cause wires (not shown) to be wound in coils in the slots of an armature (not shown) held by an armature adapter 30 and by a pair of chucks 32 and 34 mounted on the adjacent ends of the flier shafts 22 and 24 respectively. The armature adapter 30 is mounted upon a lead handling device 36 which is only diagrammatically shown in FIGURE 1. The armature being wound is rotated within the chucks 32 and 34 by an indexing mechanism, only a portion of which is illustrated at 38. The details of the fliers 18 and 20, the chucks 32 and 34, the lead handling device 36, and the indexing mechanism 38 disclosed herein may be entirely conventional and form no part of this invention. Such mechanisms are shown, for example, in United States patents to Harry W. Moore, Nos. 2,627,379 and 3,013,737 and to John M. Biddison, No. 2,670,145.

Figures 2, 3:
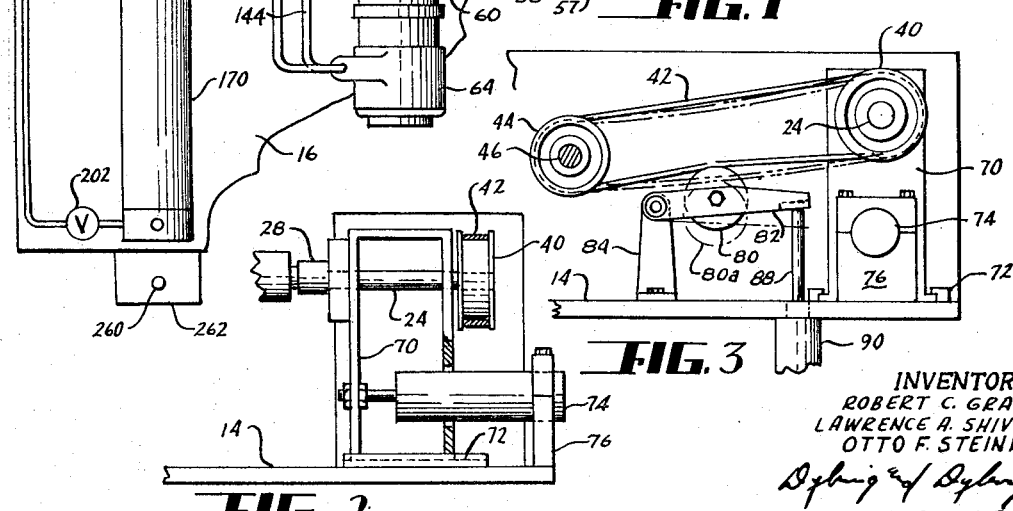
FIGURE 2 is a rear elevational view of a portion of the machine of FIGURE 1 as viewed in the direction of arrows 2—2 thereof. Again parts of the machine are cut away and parts are shown in cross section.
FIGURE 3 is a side elevational view of a portion of the machine of FIGURE 1.

With reference to FIGURES 1, 2 and 3, a pulley 40 is mounted on the outer end of the flier shaft 24 and rotates therewith. The pulley 40 is connected by a timing belt 42 to a drive pulley 44 fixedly mounted upon a cross shaft 46 which is supported for rotation upon the support plate 14 in parallel relation to the flier shafts 22 and 24 by journals 48 and 50. A similar belt drive assembly, generally designated 52, connects the cross shaft 46 to the flier shaft 22. The belt drive assembly 52 is shown mostly in phantom lines, it being located beneath a safety shield 54. For reasons well known to those skilled in the art, the drive pulley 55 of the drive assembly 52 is driven by a gear assembly 56 off the cross shaft 46 so that the fliers 18 and 20 rotate in opposite directions. Fixedly mounted at one end of the cross shaft 46 is a driven pulley 57 which is connected by a timing belt 58 to a motor pulley 60 driven by the output shaft 62 of a hydraulic motor 64. As apparent, rotation of the motor output shaft 62 causes rotation of the cross shaft 46 and consequent rotation, in opposite directions, of the fliers 18 and 20.

With reference to FIGURES 2 and 3, it will be observed that the journal 28 for the flier shaft 24 is mounted upon a bracket 70 slidably mounted in a trackway 72 on the support plate 14. The bracket 70 is moved along the trackway 72 by an air cylinder 74 connected thereto and supported upon the support plate 14 by a fixed bracket 76. The journal 26 is similarly mounted upon a slidable bracket which is moved along a trackway (not shown) by an air cylinder 78. The air cylinders 74 and 78 are operated at the same time to separate the spacing between the chucks 32 and 34 to permit indexing or insertion and removal of an armature core. Because the pulleys 40 on the flier shafts 22 and 24 are also separated, it will be apparent that the timing belts 42, which must be sufficiently taut to accurately and positively drive the flier shafts 22 and 24, will be stretched upon actuation of the air cylinders 74 and 78 to separate the chucks 32 and 34. For this reason, the timing belts 42 are designed to be slack except when the fliers 18 and 20 are being driven. The slack in the timing belts 42 is taken up by a tensioning device including a tensioning roller 80 mounted for rotation between a pair of plates 82 which in turn are pivotally mounted upon a bracket 84 on the support plate 14. The free ends of the plates 82 are interconnected by a plate 86 which is engaged by a piston rod 88 driven along a vertical path by an air cylinder 90 depending from the support plate 14. The air cylinder 90 retains the piston rod 88 in a retracted position whereupon the tensioning roller 80 occupies the position indicated by phantom lines 80a in FIGURE 3 unless the fliers 18 and 20 are being rotated.

The machine 12 as thus far described is described for purposes of illustration only as showing one embodiment of an armature winding machine wherein a hydraulic motor drives a pair of fliers in opposite directions. As is well known to those skilled in the art and as described in the Moore patents and the Biddison patent mentioned above, there may be various patterns of wind for coils wound upon armature winding machines of this general nature. For example, one pattern of wind may call for the rotation of the fliers 18 and 20 in opposite directions for a predetermined number of turns to wind a first pair of coils, the stopping of the fliers, the reverse rotation of each of the fliers through 90 to 180°, and then the subsequent repeating of the initial or "forward" direction of wind through the same predetermined number of turns to wind a second pair of coils. The purpose of the brief reverse rotation of the fliers is to enable the connection of a portion of the wire to commutator tangs (not shown) or to arrange for the hooking of the wire about pawls or the like (not shown) in order to form lead loops between coils. The foregoing steps would be repeated until an armature is fully provided with coils.

During the forward wind it is most desirable that the fliers be driven at a very high speed to minimize the total winding time. As described in the aforementioned Moore Patent 3,013,737, it would be undesirable to suddenly stop fliers rotating at high speeds. Accordingly it is now the practice to decelerate the rotation of the fliers gradually by stepping down the hydraulic drive from a high speed "forward" before the motor is stopped. The pattern of wind being used or the type of wire being used may require the use of a low speed forward wind when the rotation of the fliers is first initiated or the winding pattern may require the use of a low speed forward wind with or without an immediately succeeding high speed forward wind. In view of the foregoing considerations, a hydraulic control system is provided by this invention operative in response to the rotary output of the hydraulic motor 64 selectively to drive the motor 64 in a low speed and a high speed "forward" direction and in a low speed "reverse" direction. Also, because the same armature winding machine may be used to wind armatures having different patterns of wind, the motor control system to be described herein can be very simply adjusted to arrange for a high speed "reverse" rotation of the fliers in addition to a low speed reverse and a low speed forward. The motor control system will now be described with reference to FIGURES 1 and 4 through 9.

Figures 4, 5:
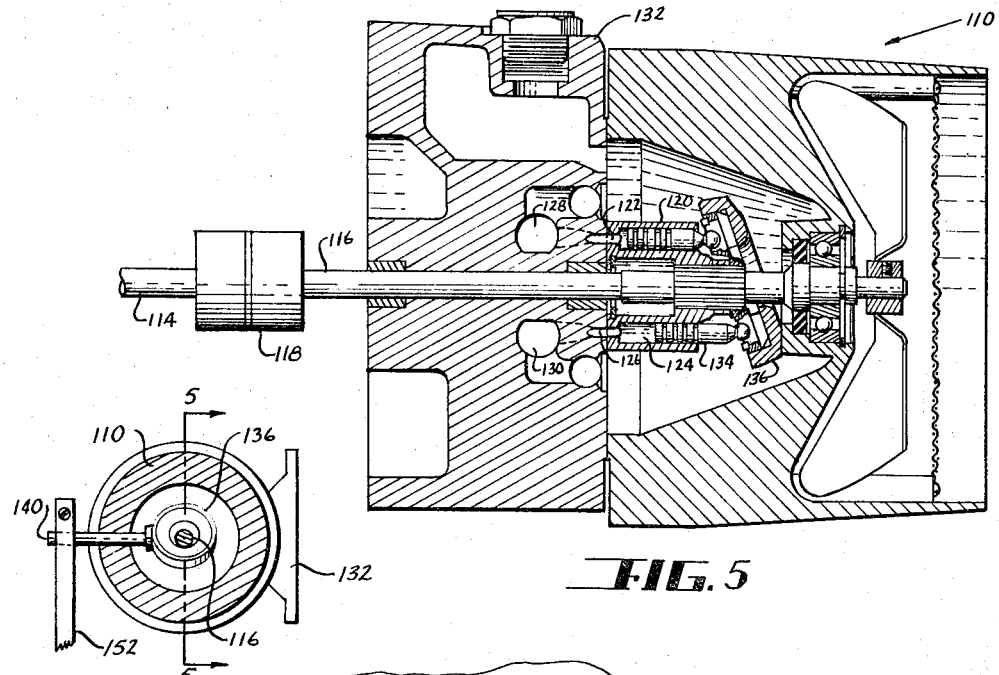
FIGURE 4 is a cross-sectional view taken along lines 4—4 of FIGURE 1 of a hydraulic pump used in accordance with this invention.
FIGURE 5 is a longitudinal cross-sectional view of the pump taken along line 5—5 of FIGURE 4.

The hydraulic motor 64 forms part of an adjustable speed hydraulic drive including a piston type pump 110 driven by an electric motor 112 having an output shaft 114. The pump 110 and the electric motor 112 may be mounted on the lower support plate 16. The motor shaft 114 is connected to a pump drive shaft 116 by a flexible coupling 118. A cylinder block 120 (FIGURE 5) within the housing of the pump 110 rotates with the drive shaft 116 to cause ports 122 of cylindrical chambers 124 in the block 120 to pass over openings 126 to a pair of ports 128 and 130 in a valve plate 132. As the pump drive shaft 116 rotates, pistons 134 slidable in the chambers 124 serve to pump oil from the one of the ports 128 and 130 to the other in a direction and at a rate determined by the orientation of a yoke 136 relative to the cylinder block 120. If the yoke 136 is oriented perpendicularly to the drive shaft 116 (in a vertical position in FIGURE 5), the pistons 134 would not slide within the chambers 124 and no oil would be pumped. As the angle between the yoke 136 and the perpendicular to the drive shaft 116 is increased, the flow of oil from one of the ports 128 and 130 to the other is increased. As illustrated in FIGURE 4, a pump speed control stem 140 is connected to the yoke 136 to rotate the yoke 136 about an axis normal to and coplanar with the pump drive shaft 116 in order to control the direction and amount of oil flow. The ports 128 and 130 are, of course, connected to ports (not shown) in the hydraulic motor 64 as by fluid conduits 142 and 144. It will be understood that the hydraulic motor 64 and the hydraulic pump 110 are illustrated and described schematically and that such pumps and motors are entirely conventional. The pump illustration of FIGURES 4 and 5 is a greatly simplified drawing of a pump sold by Vickers Incorporated of Troy, Mich., under the model designation HAS–4–10.

In accordance with this invention, the speed control stems 140 is rotated about its axis by a pneumatically operated speed and direction control device, generally designated 150 illustrated in different operating positions in FIGURES 6, 7, 8, and 9. The speed control device 150 includes a control lever 152 clamped at one end to an exposed portion of the control stem 140 projecting out of the housing of the pump 110. A control link 154 is mounted by a pivot 156 on the free end of the lever 152 for pivotal movement about an axis parallel to the axis of rotation of the control stem 140. As will become apparent, the low speed and direction of the pump 110 and motor 64 is controlled by a compound, double acting pneumatic actuator 158 having two piston rods 160 and 162 projecting from the opposite ends thereof. The piston rod 160 is mounted by a pivot 166 upon a laterally projecting arm portion 164 of the control lever 152 while the piston rod 162 is connected by a pivot 168 to the control link 154 for pivotal movement about an axis spaced from and parallel to the axis of the pivot 156.

A high speed control for the pump 110 and the motor 64 comprises a simple, double acting pneumatic actuator 170 having a piston rod 172. The actuator 170 is connected by a pivot 174 in fixed relation to the pump 110 upon the lower support plate 16. A pivotal connection 176 between the free end of the piston rod 172 and the link 154 permits the link 154 to pivot upon the piston rod 172 about an axis parallel to the pivot 168 and diametrically opposed thereto with respect to the pivot 156.

Figure 6:
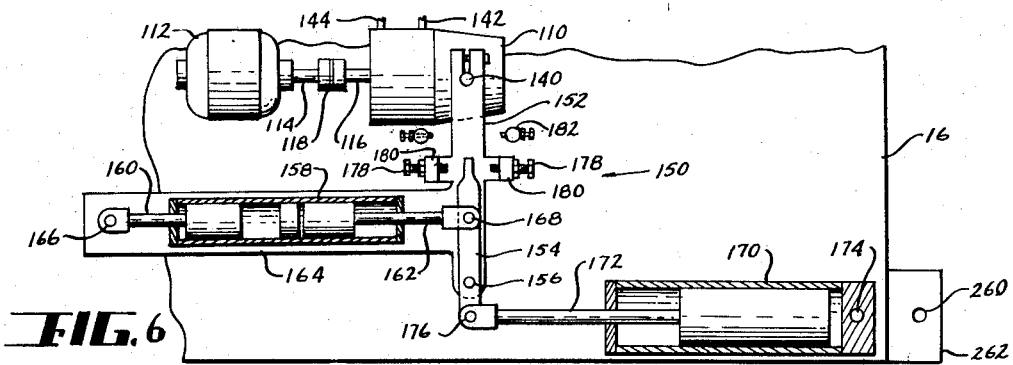
FIGURE 6 is a plan view with parts in cross section of a portion of a speed and direction control device shown in FIGURE 1.

As viewed in FIGURE 6, the axes of the stem 140 and of the pivots 156, 168 and 176 are aligned with the vertical axis of lever 152 in an imaginary plane which is perpendicular to the longitudinal axis of the pump drive shaft 116. The connection between the control lever 152 and the stem 140 is such that the yoke 136 occupies the same position relative to vertical as the vertical portion of the lever 152. Hence, when the various pivot points are aligned with the stem 140, as illustrated in FIGURE 6, the yoke 136 is perpendicular to the pump drive shaft 116 and, although the drive shaft 116 may be rotating, no oil will flow through the conduits 142 and 144. Thus, FIGURE 6 illustrates the neutral position of the speed control device 150 when the hydraulic motor 64 is at rest.

Figure 7:
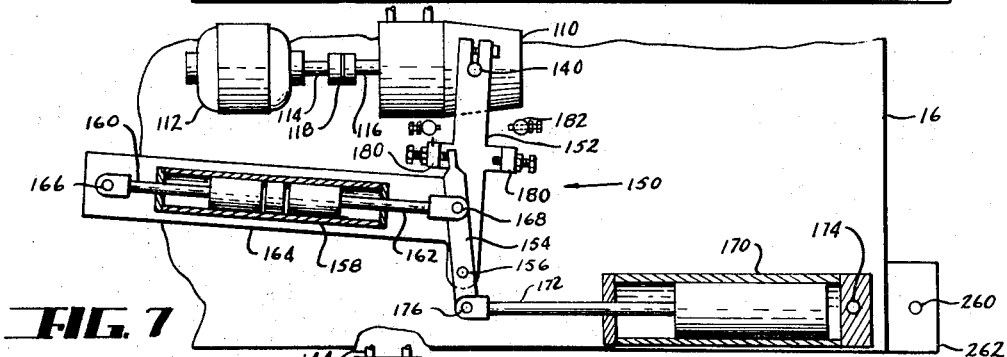
FIGURES 7, 8 and 9 are plan views similar to FIGURE 6 but disclosing the control apparatus in different parts of an operating cycle.

In FIGURE 7, the control lever 152 and the stem 140 have been rotated through a small angle in a clockwise direction by retraction of the piston rod 160 partially into the cylinder of the pneumatic actuator 158, which retraction has caused the link 154 to rotate about the pivot 176 and consequently caused the pivot 156 along with the lever 152, to move in the clockwise direction. Because the longitudinal axis of vertical portion of the lever 152 is essentially coplanar with the yoke 136, it is apparent that the yoke 136 has been moved away from the perpendicular to the drive shaft 116. Accordingly, the pump 110 will operate to cause an oil flow from one of the conduits 142, 144 to the other, and the hydraulic motor 64 will operate to rotate the fliers 18 and 20. For convenience, the direction of flier rotation caused by the position of the speed control mechanism 150 shown in FIGURE 7, upon retraction of the piston rod 160, may be called the "forward" direction. Because the yoke 136 is pivoted only slightly from the perpendicular, the motor 64 may be said to be rotating in "low speed forward."

Figure 9:
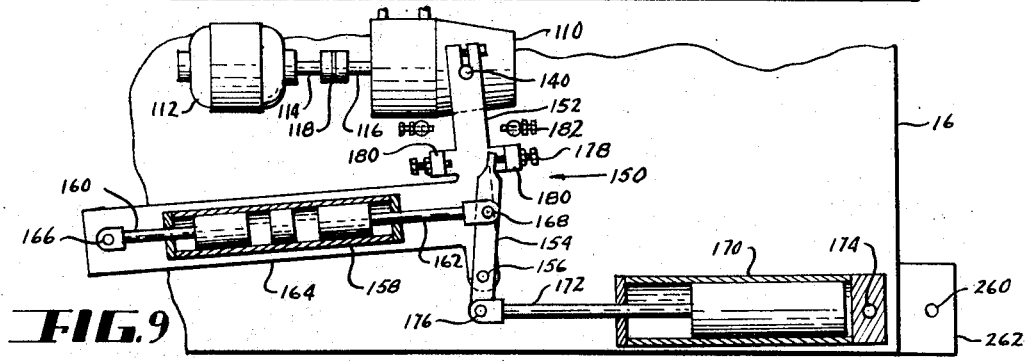

In FIGURE 9, the pump control stem 140 has been pivoted slightly in a counterclockwise direction by an extension of the piston rod 162 while the piston rod 160 is also extended. Following the above terminology, it is apparent that the hydraulic motor 64 would then be rotating in "low speed reverse."

Figure 8:
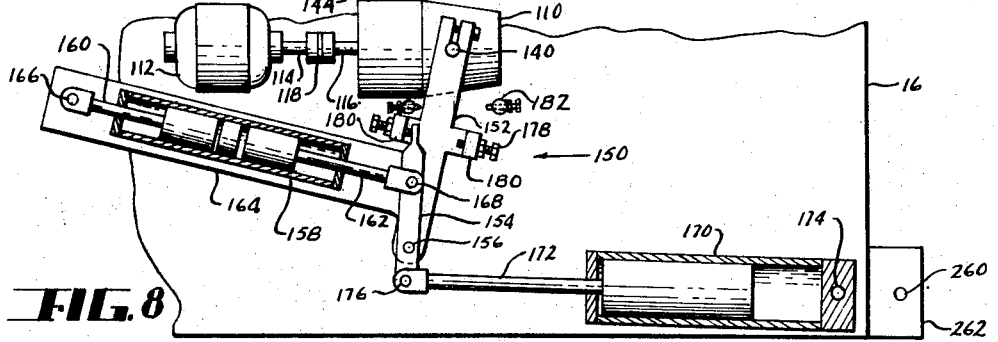

A "high speed forward" rotation of the hydraulic motor 64 occurs when the speed control device 150 is adjusted as shown in FIGURE 8. In FIGURE 8, the low speed and direction actuator 158 has both piston rods 160 and 162 retracted for purposes of creating the "low speed forward" condition of FIGURE 7. In addition, the piston rod 172 of the high speed actuator 170, which is normally retracted, has been extended to move the pivot point 176 to the left as viewed in FIGURE 8. Because the relative position of the link 154 and the lever 152 is maintained by the low speed and direction actuator 158, the lever 152, accordingly, rotates further in a clockwise direction, thereby increasing the angle of the yoke 136 and the output speed of the hydraulic motor 64.

The throw of the link 154 in both directions is limited by a pair of abutments 178 threaded in flanges 180 on the sides of the vertical portion of the control lever 152. When the upper end of the link 154 strikes either of the abutments 178, further rotation thereof is impossible. Because the abutments 178 may be turned in the flanges 180 to vary their spacing, the maximum throw of the link 154 in response to movement of the piston rods 160 and 162 can be adjusted from a very small amount to a maximum determined by the size of the actuator 158. A pair of abutments 182 are shown mounted upon the lower support plate 16 in straddling relation to the lever 152. The abutments 182 are made adjustable in the same manner as the abutments 178 to provide an adjustable limit to the high speeds and prevent excessive rotation of the control stem 140 which could result in damage to the pump 110.

As schematically illustrated in FIGURE 1, the pneumatic actuator 158 may be connected by two pairs of air lines 184 and 186 to a "forward" air valve 188 and a "reverse" air valve 190, respectively, which are positioned by a "forward" solenoid 192 and a "reverse" solenoid 194, respectively. The high speed actuator 170 is similarly shown connected by air lines 196 to a "high speed" air valve 198 to which a "high speed" solenoid 200 is connected. In each of the air lines 196 is a variable restricter or valve 202 which is adjustable to limit the speed with which the piston rod 172 is retracted and subsequently extended. By restricting the speed of operation of the high speed actuator 170, the rotational speed of the fliers 18 and 20 can be gradually increased and decreased between their low speed and their maximum high speed. The air valves 188, 190 and 198 are connected to a suitable source of air under pressure (not shown).

The solenoids 192, 194, and 200 are controlled electrically by an electric circuit (not shown) having a plurality of switches operated throughout a winding cycle. The techniques of cycle controls for machines such as armature winders are highly developed and it will be appreciated that such controls for the actuators 158 and 170 can be entirely conventional. The presently preferred electric control system is one in which the rotation of the cross shaft 46 is sensed during its rotation to control the acceleration and deceleration (and stopping) of the motor 64. Since the cross shaft 46 rotates at the same speed as the fliers 18 and 20, such an electric control system is deemed to provide the most positive and reliable positioning of the fliers.

Although the electric circuitry controlling the solenoids 192, 194 and 200 is not shown, one form of cycle or sequence control is partially illustrated in association with the cross shaft 46. In FIGURE 1, the cross shaft 46 is shown connected by a worm gear assembly 210 to a coil cycle shaft 212 which drives an armature cycle control shaft 214 through a gear and ratchet mechanism 216. As already noted, the cross shaft 46 makes one complete revolution for each complete revolution of the fliers 18 and 20, or, in other words, one complete revolution for each turn of wire forming a coil. The gear ratio between the cross shaft 46 and the coil cycle shaft 212 is such that the latter shaft 212 makes one complete revolution for each coil, or pair of coils, wound. The armature cycle control shaft 214 makes one complete revolution for each complete cycle of the machine, i.e., for each armature wound.

Three cams 218, 220 and 222 on the cross shaft 46 are shown in operative relation with three cam operated switches 224, 226 and 228 respectively. An electric circuit relationship is schematically shown by a line 230 leading from the switches 224 and 226 to the "forward" solenoid 192 and an electric circuit relationship between the switch 228 and the "reverse" solenoid 194 is schematically indicated by a line 232. Similarly, three cams 234, 236 and 238 on the coil cycle shaft 212 control three switches 240, 242 and 244 respectively. The switch 240 is shown connected to the circuit line 230 while the switches 242 and 244 are connected by an electric circuit indicated by a line 248 to the "high speed" solenoid 200.

The array of switches and electric circuits described above is used in association with other switches (not shown) controlled by other operations of the machine 12. For example, operation of the index mechanism 38 can initiate a high speed forward wind by energizing both the "forward" solenoid 192 and the "high speed" solenoid 200. During the winding of the first pair of coils by the fliers 18 and 20, the switch 242 is momentarily placed under pressure by its cam 236 to trigger a high speed holding relay (not shown). About 2 or 3 turns prior to end of the winding of the first pair of coils, the switch 244 is placed under pressure and remains under pressure to deenergize the high speed solenoid 200 to reduce the flier speed. The circuit is so designed that the holding relay must be set up by the switch 242 and the switch 244 must be under pressure to deactivate the high speed actuator 170. A subsequent actuation of the index mechanism 38 drops out the holding relay to permit a high speed wind even if the switch 244 is still under pressure.

The stopping of the fliers 18 and 20 can be accomplished by the placing of the switch 240 under pressure to thereby signal the last turn by setting up another holding relay (not shown). When the switch 226 subsequently comes under pressure during the last turn, the solenoid 192 is deenergized. Thus, unless the switch 240 is under pressure, operation of the switch 226 has no effect. The switch 224 replaces the function of the switch 226 for finally stopping the fliers 18 and 20 at the end of the wind of the last pair of coils wound on an armature. One of a number of cycle switches 256 controlled by a series of cams 250, 252 and 254 on the armature cycle control shaft 214, can be used to determine whether switch 224 or switch 226 controls the stopping of the flier rotation. The switch 228 is operative, again at the signal of one of the cycle switches 256, to stop flier rotation in a reverse direction. The aforementioned Moore patent, No. 3,013,737, describes a similar set of switch controls for an automatic armature winding machine in somewhat greater detail.

Referring again to FIGURES 6 through 9, the high speed actuator 170, as positioned therein, operates to create a high speed wind in the forward direction only. There is rarely any necessity for a high speed reverse. However, it often is desired to adjust the winding machine 12 to provide for a pattern of wind wherein the "forward" direction as used above becomes "reverse" for a particular type of armature. Hence, it is desirable to provide for a change over of the speed control device 150 to provide a high speed in the "reverse" direction described above. To this end, spaced pivot points are provided for connecting the actuator 170 in fixed relation to the pump 110. Thus, the pivot 174 can be moved to the right, as viewed in FIGURE 6, and attached to a pivot receiving aperture 262 in a plate 260 connected to the lower support plate 16. This, of course, is done while the machine 12 is not operating. At the same time, the connections of the air lines 196 to the high speed actuator 170 are reversed. As a result, the piston of the actuator 170 will be in the left side of its chamber during low speed and when the parts are otherwise in the neutral position of FIGURE 6. High speed is then obtained by the actuator 170 moving the piston rod 172 and, accordingly, the pivot point 176 to the right, thereby rotating the lever 152 in an extreme counterclockwise direction beyond that illustrated in FIGURE 9.

FIGURE 10 shows a somewhat more elaborate speed control device, generally designated 268, utilizing a compound, double acting high speed pneumatic actuator 270 having a piston rod 272 connected by a pivot 274 to a control link 154. A second piston rod 276 projects from the opposite end of the actuator 270 and is connected by a pivot 278 to the lower support plate 16. The other parts of the speed change device illustrated in FIGURE 10 may be identical to the corresponding parts of the device shown in FIGURES 6 through 9 and are identified by the same reference characters. It is obvious that the compound high speed actuator 270 can be used, with no mechanical changes, to create a high speed drive in either a "forward" or a "reverse" direction. The high speed "reverse" is illustrated in FIGURE 10. The device of FIGURE 10 with suitable electrical and air valve control circuitry can be used in place of the device shown in FIGURES 6 through 9. The high speed direction of wind can be changed without moving the pivot point of the actuator 270. However, the device of FIGURE 10 is intended primarily for use in winding armatures having an "oscillating" pattern of wind in which succeeding pairs of coils are wound in opposite directions. The electric control circuitry, including a switch 256 actuated by a cam on the armature cycle control shaft 214, would then alternately energize the actuator 270 in opposite directions for successive coils.

Although the presently preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described our invention, we claim:

1. In a winding machine, a drive mechanism comprising: a rotatable shaft; a hydraulic motor having an output shaft drivingly connected to said rotatable shaft; a hydraulic pump hydraulically connected to said motor, said pump including a rotatable control stem which may be rotated about a predetermined axis to vary the speed and direction of rotation of said motor; a speed control device including a control lever connected to said stem, first means for selectively rotating said lever through a predetermined angle about said axis in either one direction or the opposite direction about said axis, and second means for rotating said lever through an additional angle in at least one of said directions; and means including switch means operating in response to rotation of said rotatable shaft controlling the operation of said first means and said second means.

2. The mechanism of claim 1 wherein said speed control device includes a control link pivotally mounted on said lever and wheerin said first means and said second means are connected to said link at spaced pivot points.

3. The mechanism of claim 2 wherein the connections of said first means and said second means to said link are at pivot points on diametrically opposite sides of the point of connection of said link to said lever.

4. The mechanism of claim 2 wherein said second means is pivotally connected to said link and to a point fixed in relation to said pump and energization of said first means causes said link to pivot with respect to said second means, thereby causing said lever to rotate.

5. The mechanism of claim 4 wherein adjustable abutments on said lever limit pivotal movement of said link.

6. The mechanism of claim 4 wherein said first means comprises a compound fluid actuator having two piston rods, one of said piston rods being connected to said lever and the other of said piston rods being connected to said link.

7. The mechanism of claim 6 wherein said second means comprises a compound fluid actuator having two piston rods, one connected to said link and one fixed in relation to said pump.

8. The mechanism of claim 6 wherein said second means comprises a fluid actuator.

9. In a machine of the class described, a drive mechanism comprising: a rotatable shaft; a hydraulic motor having an output shaft drivingly connected to said rotatable shaft; a variable displacement hydraulic pump hydraulically connected to said shaft; and a speed and direction control device partially controlled by rotation of said rotatable shaft connected to said pump and including first means for selectively adjusting the displacement of said pump for driving said motor at a low speed in either of its two directions of rotation, and second means connected to said pump for increasing the speed of rotation of said motor in at least one of the two directions.

10. The mechanism of claim 9 wherein said pump includes a control stem rotatable about a predetermined axis and wherein said speed and direction control device further includes a control lever connected to said stem, a control link mounted on said lever for pivotal movement about an axis parallel to said predetermined axis, and wherein the connections of said first means and said second means to said pump includes spaced pivots on said link.

11. The mechanism of claim 9 wherein said second means comprises a pneumatic actuator and wherein valve means connected to said actuator limit the speed of operation thereof.

12. A speed and direction control device for a hydraulic pump of the type having a control stem rotatable about a predetermined axis to control the rate and direction of the output of said pump, said device comprising a control lever connected to said stem, a control link mounted for pivotal movement upon said lever, first means connected between said lever and said link for rotating said link in either direction about its pivot on said lever, and second means connected between said link and a point fixed in relation to said pump for rotating both said link and said lever about said predetermined axis, said lever rotating through a small angle about said predetermined axis upon pivotal movement of said link relative to said second means upon operation of said first means.

13. The device of claim 12 wherein both said first means and said second means are pneumatic actuators.

14. The device of claim 12 wherein adjustable abutments on said lever limit the degree of rotation of said link.

15. The device of claim 12 wherein said second means comprises a fluid actuator, and wherein there are more than one pivot receiving means fixed in relation to said pump to which said actuator may be connected, the point of connection of said actuator being determined by the direction of movement of said lever desired upon operation of said second actuator.

16. The device of claim 12 wherein both said first means and said second means are compound pneumatic actuators.

No references cited.

EDGAR W. GEOGHEGAN, *Primary Examiner.*